United States Patent Office 2,976,298
Patented Mar. 21, 1961

2,976,298

α-HYDROXY-β,β-DIMETHYL-γ-BUTYROLACTONE AND A PROCESS FOR PRODUCING SAME

Howard C. Klein, Brooklyn, N.Y., and Richard Griffith, Middletown, N.J., assignors to Nopco Chemical Company, Harrison, N.J., a corporation of New Jersey No Drawing. Filed Dec. 4, 1958, Ser. No. 778,066

9 Claims. (Cl. 260—343.6)

This invention relates, in general, to a new and improved process for the production of α-hydroxy-β,β-dimethyl-γ-butyrolactone. More particularly, the invention relates to an economical and commercially feasible procedure for converting α,γ-dihydroxy-β,β-dimethylbutyramide to highly refined α-hydroxy-β,β-dimethyl-γ-butyrolactone.

α,γ-Dihydroxy-β,β-dimethylbutyramide, which, for convenience, will be referred to herein after as pantamide, is an intermediate which is extremely useful in the synthesis of derivatives of pantothenic acid. Numerous processes for the production of this compound have been disclosed in the art. Thus, for example, pantamide has been produced in the past by reacting, under pressure, gaseous ammonia and α-hydroxy-β,β-dimethyl-γ-butyrolactone. For convenience, the latter compound will be referred to hereinafter merely as pantolactone. Moreover, pantamide has been obtained by condensing pantolactone either with liquid ammonia in an alcoholic medium or with ammonia in a dilute aqueous medium.

The direct conversion of pantamide into desired derivatives of pantothenic acid is well known in the art. However, prior to its use in the synthesis of a pantothenic acid compound, it is often necessary to purify pantamide. Obviously, purification procedures are time-consuming and, hence, costly, and often they can entail rather substantial losses of valuable product. As an alternative, it has been proposed to convert pantamide into pantolactone and to use the latter compound, in the preparation of the pantothenic acid derivative, since, in the process for its production from pantamide, pantolactone is rendered substantially free of impurities. As a general rule, however, the steps involved in the conversion of pantamide to pantolactone are far more burdensome than those involved in the purification of the amide. For example, conventional procedures for converting pantamide to pantolactone involve several steps. In a typical procedure, the amide is reacted first with an alkali, such as, sodium hydroxide, to produce a pantothenic acid salt, such as, sodium pantoate. Thereafter, the pantothenic acid salt is treated at elevated temperatures with an excess of mineral acid to hydrolyze salt to acid and to form therefrom the lactone compound. The crude lactone which is thus produced is then extracted with solvent and subsequently isolated by distillation. Where D(+)-pantamide is in use, the physiologically active D(−)-pantolactone is obtained and this compound, by reaction with β-alanine or its derivatives, can be converted to physiologically active D(+)-pantothenic acid or a derivative thereof. Where L(−)-pantamide is in use, the product, thus obtained, is L(+)-pantolactone. Since the reaction of this product with β-alanine, or a derivative thereof, would yield the physiologically inactive laevorotatory isomer of pantothenic acid or pantothenic acid derivative, the L(+)-pantolactone must be racemized to DL-pantolactone. The racemic mixture must then be resolved to obtain the valuable D(−)-pantolactone. Where DL-pantamide is the starting material, the product obtained is DL-pantolactone. This racemic mixture must be resolved to recover the valuable D(−)-pantolactone. From the foregoing it is obvious that conventional procedures for converting pantamide to pantolactone are, from a commercial standpoint, highly impractical. Not only are several steps required to convert D(+)-pantamide, L(−)-pantamide and DL-pantamide to D(−)-pantolactone, L(+)-pantolactone and DL-pantolactone, respectively, but also, in the instance where L(−)-pantamide is the starting material, the L(+)-pantolactone which is obtained must be subjected to an additional racemization step.

It is an object of this invention to provide a method for producing α-hydroxy-β,β-dimethyl-γ-butyrolactone.

It is a further object of the invention to provide a method for converting α,γ-dihydroxy-β,β-dimethylbutyramide to α-hydroxy-β,β-dimethyl-γ-butyrolactone.

A more particular object of the invention is to provide a practical and commercially feasible method for obtaining pure α-hydroxy-β,β-dimethyl-γ-butyrolactone from α,γ-dihydroxy-β,β-dimethylbutyramide.

Other objects of the invention will be obvious and will in part appear hereinafter.

We have discovered that an excellent yield of substantially pure pantolactone is obtained when pantamide is heated at a temperature elevated above room temperature preferably, at a temperature above about 100° C., using such techniques and equipment as will permit the escape of gaseous ammonia which is generated with the decomposition of the amide.

In the practice of this invention one may convert either the racemic (DL)-pantamide to (DL)-pantolactone or one of the optically active enantimorphs, that is, D(+)-pantamide or L(−)-pantamide to D(−)-pantolactone or L(+)-pantolactone, respectively. Obviously, since D(−)-pantolactone finds wide use in the synthesis of physiologically active D-pantothenic acid or its esters or salts, the invention is concerned primarily both with the production of that compound from D(+)-pantamide and with the production of racemic mixtures containing that compound from (DL)-pantamide. However, it should be understood that the invention encompasses also, the conversion of L(−)-pantamide to L(+)-pantolactone. In fact, the present process is such that it can be utilized as one-step method for the conversion of L(−)pantamide to (DL)-pantolactone. Under certain conditions, which will be described fully hereinafter, L(−)-pantamide can be converted in a single operation to valuable (DL)-pantolactone without isolating the physiologically inactive L(+)-pantolactone which is formed at some point during the process as an intermediate reactant. In effect, this one-step method permits one to accomplish the simultaneous, or at least concurrent, conversion of L(−)-pantamide to L(+)-pantolactone and racemization of L(+)-pantolactone to (DL)-pantolactone.

As indicated heretofore, the present process is a single step procedure involving only the heating of pantamide at elevated temperatures. Heating decomposes the amide, causing generation and evolution of ammonia gas and the formation of the lactone ring. The heating step should be carried out under such conditions and using such techniques and such equipment as will permit the escape of the ammonia gas which is present in the system concurrently with its formation. In the practice of this invention, pantamide is heated, preferably, to a temperature within the range of from about 100° C. to 245° C. Heating is continued until the desired product has been formed. However, although the process of the invention is preferably carried out at temperatures of from about 100° C. to 245° C. it is to be understood that the invention is not limited to the use of a temperature within that range. In general, the invention is fully operative at any temperature within the range of from about room temperature to the boiling point of the compound. If desired, the process could be carried out at temperatures above the boiling point of the compound by the use of super-atmospheric pressures. However, under such conditions, means would have to be provided to expel the evolved ammonia from the system. The use of such conditions are, however, considered to be highly impractical from a commercial standpoint.

The temperature which is used in the practice of the invention will determine the length of time that will be required to accomplish substantially complete conversion of pantamide to pantolactone. At any temperature within the operable range, the pantamide should be heated for a period of time which is long enough to bring about the desired conversion to pantolactone. The length of time required to bring about the desired conversion, at any particular temperature, can be determined, experimentally, in advance of any plant run. One need only heat the compound at a selected operating temperature, sample the heated compound at certain intervals and subject the sample to an amide-nitrogen determination using conventional procedures. When these determinations reveal a substantial absence of amide-nitrogen the conversion of amide to lactone is, for all intents and purposes, complete. The time required to bring about the desired conversion of pantamide to pantolactone in the trial run, will be the same as that required to effectuate the conversion, at the same temperature, in a large scale run. When either D(+)-pantamide or L(−)-pantamide is used as the starting material, the progress of the reaction can be followed also, by determining, at designated intervals during the heating step, the optical rotation of the heated product. The change in rotation will indicate when substantially complete conversion of amide to lactone has been accomplished. It will be found that, at lower temperatures a longer heating period will be necessary to bring about the desired result. Accordingly, since the value of our process is attributable, at least in part, to the fact that it provides an efficient and convenient means for bringing about the conversion of pantamide to pantolactone, rarely, if ever, will it serve any useful purpose to practice our invention at a temperature below about 100° C.

The precise manner in which the heating step is carried out is not particularly critical and it does not restrict the practice of the invention. From the foregoing discussion of the invention, it will be readily apparent that there are a number of ways in which the process can be carried out. Thus, for example, substantially complete conversion of pantamide to pantolactone can be accomplished by heating pantamide in a distillation apparatus at a temperature within the range of from about 240° C. to 245° C. Using such a procedure, the distillate recovered will be predominantly (DL)-pantolactone regardless of whether the starting material is D(+)-pantamide, L(−)-pantamide or (DL)-pantamide. Under the described conditions it will be found that D(+)-pantamide, L(−)-pantamide and (DL)-pantamide have been converted into D(−)-pantolactone, L(+)-pantolactone and (DL)-pantolactone, respectively, and that, in the same operation, the D(−)-pantolactone and L(+)-pantolactone have been racemized to (DL)-pantolactone. From this it will be appreciated that atmospheric distillation at a temperature of 240° C. to 245° C., as a means for practicing our invention, is employed preferably only when L(−)-pantamide is to be converted to lactone. When D(+)- or (DL)-pantamide are to be converted to lactone by our method, lower temperatures, as, for example, temperatures not above about 140° C. are preferably used. In the case of D(+)-pantamide, such lower temperatures will favor the formation of the desired and valuable D(−)-pantolactone and minimize the formation of (DL)-pantolactone. Formation of D(−)-pantolactone from D(+)-pantamide can be accomplished simply by heating the pantamide in an open vessel at a temperature not higher than 140° C. for such a period of time as is found, by experimentation, to be sufficient to bring about the desired conversion. Heating at an elevated temperature for a time longer than that required to accomplish the conversion of D(+)-pantamide to D(−)-pantolactone should be avoided, if at all possible, since excessive heating will tend to racemize at least part of the D(−)-pantolactone. The reaction at lower temperatures is facilitated greatly by the continuous passage of an inert gas, such as, nitrogen, into the heated compound. The inert gas serves to aid in purging the liberated ammonia from the system.

As an alternate means for carrying out our invention, conversion of pantamide to pantolactone can be accomplished by heating the amide while it is dissolved, dispersed or suspended in the media of an inert organic solvent. We prefer to employ a high boiling solvent, that is, a solvent having a boiling point above about 100° C. Moreover, to facilitate the recovery of pantolactone, we prefer to employ a solvent in which the lactone is not soluble or with which the lactone is not miscible. As used in the specification and in the claims, the term "inert" should be construed as including only solvents which will not react either with the amide or with the lactone at the temperatures used in our process. Excluded for use, therefore, are solvents, such as, acids, acetyl halides, aldehydes, etc. which will undergo reaction in our system. Suitable for use are solvents, such as, hydrocarbons alcohols, esters, ketones, amines, etc. These include solvents such as, mineral oils, naphtha, benzene, xylene, tetrahydronaphthalene, methyl alcohol, ethyl alcohol, propyl alcohol, butyl alcohol, tributyl amine, triisopropyl amine, dimethyl aniline. Particularly well suited for use, and hence, those employed in the preferred practice of the invention are high boiling point solvents, for example, those boiling above about 100° C. in which the lactone is not soluble or with which the lactone is not miscible. These include solvents, such as, mineral oils, naphtha, xylene, tetrahydronaphthalene, tributyl amine, etc. As was the case with a solvent-free system, passage of an inert gas, such as, nitrogen, into the solution, dispersion or suspension of pantamide during the heating step will aid in purging the liberated ammonia gas from the system as it is formed and, in doing so, it will facilitate the conversion of pantamide to pantolactone.

Our invention is significant inasmuch as it provides a convenient means for converting pantamide to pantolactone in excellent yields and in a high degree of purity. Pantolactone which is obtained by our method has been found to be free of undesirable color bodies and devoid of any foreign odors. D(−)-pantolactone, which in the practice of our invention is produced directly from D(+)-amide, can be converted, without further purification or refinement, to the desired pantothenic acid compound simply by reacting it with β-alanine, its salts or its esters. Moreover, D(−)-pantolactone which is present in the racemic (DL)-pantolactone mixtures can be separated from the L(+)-lactone by conventional procedures and used in the synthesis of the desired pantothenic acid compound without further purification or refinement. Finally, when our process is carried out at temperatures above about 140° C., it can be utilized to convert pantamide, particularly, L(−)-pantamide, in a single operation to (DL)-pantolactone. The racemic mixture can be resolved into its components and the D(−)-lactone ultimately obtained can be used in the production of valuable pantothenic acid derivatives.

For a fuller understanding of the nature and objects of this invention, reference may be had to the following examples which are given merely as further illustrations of the invention and are not to be construed in a limiting sense.

*Example I*

In this example, L(−)-$\alpha,\gamma$ - dihydroxy - $\beta,\beta$ - dimethyl-butyramide [$\alpha$]$_D$=−30.46 (c.=5% in methanol;

$N_2=9.47$] was distilled atmospherically at a temperature within the range of from about 240° C. to 245° C. The distillate recovered was (DL)-$\alpha$-hydroxy-$\beta,\beta$-dimethyl-$\gamma$-butylralactone and it was vacuum dried at room temperature.

The example demonstrates the utility of the invention as a single step process for converting L(—)-pantamide to (DL)-pantolactone. Heating L(—)-pantamide at the elevated temperatures designated herein not only converted L(—)-pantamide to L(+)-pantolactone but also, and in a single operation, it converted L(+)-pantolactone, which in and of itself is worthless, to valuable (DL)-pantolactone.

The pantolactone which was produced by this method had $(\alpha)_D=3.97$ (c.=5% in methanol), equivalent to about 87% (DL)-pantolactone. The product had a content of $N_2=0.3\%$, equivalent to 3.18% by weight of unreacted pantamide.

*Example II*

In this example, 10.0 grams of D(+)-pantamide [$(\alpha)_D=24.2$ (c.=5% in water); $N_2=10.9$] was suspended in 50 ml. of VMP naphtha which boiled at a temperature within the range of from about 110° C. to 130° C. The suspension was heated at reflux for about 16 hours and thereafter cooled to room temperature. The naphtha was decanted and the residue was dried.

Pantolactone was obtained having $(\alpha)_D=-30.46$ (c.=5% in water); $N_2=1.61$, indicative of about 83.0% conversion of D(+)-pantamide to D(—)-pantolactone.

*Example III*

In this example, 100 grams of (DL)-pantamide were refluxed in 250 ml. of methyl alcohol having a boiling point of about 65° C. for a period of about 7 hours. Thereafter, the mixture was evaporated to dryness. The residue which remained was taken up in 250 ml. of methylene chloride and the solution thus obtained was filtered. The insoluble solids, which remained after the filtration of the methylene chloride solution, weighed 47.6 grams on drying. This insoluble product was unreacted pantamide. Evaporation of the methylene chloride solution to dryness yielded 44.8 grams of (DL)-pantolactone.

This example demonstrates, among other things, that pantamide can be converted to pantolactone at relatively low temperatures. It demonstrates, also, that when such temperatures are used, complete conversion of amide to lactone will require a longer heating period than that used herein.

Having described our invention, what we claim as new and desire to secure by Letters Patent is:

1. A process for the production of $\alpha$-hydroxy-$\beta,\beta$-dimethyl-$\gamma$-butyrolactone from $\alpha,\gamma$-dihydroxy-$\beta,\beta$-dimethylbutyramide which comprises heating said amide at a temperature of from about 100° C. to 245° C. for a period of time to substantially completely convert said amide to said lactone and removing from the system, concurrently with its formation, substantially all of the ammonia gas present therein.

2. The process of claim 1 when carried out in the presence of an inert organic solvent media.

3. A process for the production of D(—)-$\alpha$-hydroxy-$\beta,\beta$-dimethyl-$\gamma$-butyrolactone from D(+)-$\alpha,\gamma$-dihydroxy-$\beta,\beta$-dimethylbutyramide which comprises heating said amide at a temperature above about 100° C. for a period of time to substantially completely convert said amide to said lactone and removing from the system, concurrently with its formation, substantially all of the ammonia gas present therein.

4. A process for the production of L(+)-$\alpha$-hydroxy-$\beta,\beta$-dimethyl-$\gamma$-butyrolactone from L(—)-$\alpha,\gamma$-dihydroxy-$\beta,\beta$-dimethylbutyramide which comprises heating said amide at a temperature above about 100° C. for a period of time to substantially completely convert said amide to said lactone and removing from the system, concurrently with its formation, substantially all of the ammonia gas present therein.

5. A process for the production of (DL)-$\alpha$-hydroxy-$\beta,\beta$-dimethyl-$\gamma$-butyrolactone from (DL)-$\alpha,\gamma$-dihydroxy-$\beta,\beta$-dimethylbutyramide which comprises heating said amide at a temperature above about 100° C. for a period of time to substantially completely convert said amide to said lactone and removing from the system, concurrently with its formation, substantially all of the ammonia gas present therein.

6. The process of claim 3 when carried out in the presence of an inert organic solvent media.

7. The process of claim 4 when carried out in the presence of an inert organic solvent media.

8. The process of claim 5 when carried out in the presence of an inert organic solvent media.

9. A process for the production of (DL)-$\alpha$-hydroxy-$\beta,\beta$-dimethyl-$\gamma$-butyrolactone which comprises heating a compound selected from the group consisting of L(—)-$\alpha,\gamma$-dihydroxy-$\beta,\beta$-dimethylbutyramide and D(+)-$\alpha,\gamma$-dihydroxy-$\beta,\beta$-dimethylbutyramide at a temperature within the range of from about 240° C. to about 245° C. for a period of time to substantially completely convert said amide to said lactone, removing from the system, concurrently with its formation, substantially all of the ammonia gas present therein, and recovering and condensing by cooling the gaseous product which is evolved within the temperature range of 240° C. to 245° C.

References Cited in the file of this patent

UNITED STATES PATENTS 2,358,337     Lawson et al. _____ Sept. 19, 1944

OTHER REFERENCES

Kagan et al.: Jour. Amer. Chem. Soc., vol. 79, pp. 3545–3549 (1957).